United States Patent Office 3,486,437
Patented Dec. 30, 1969

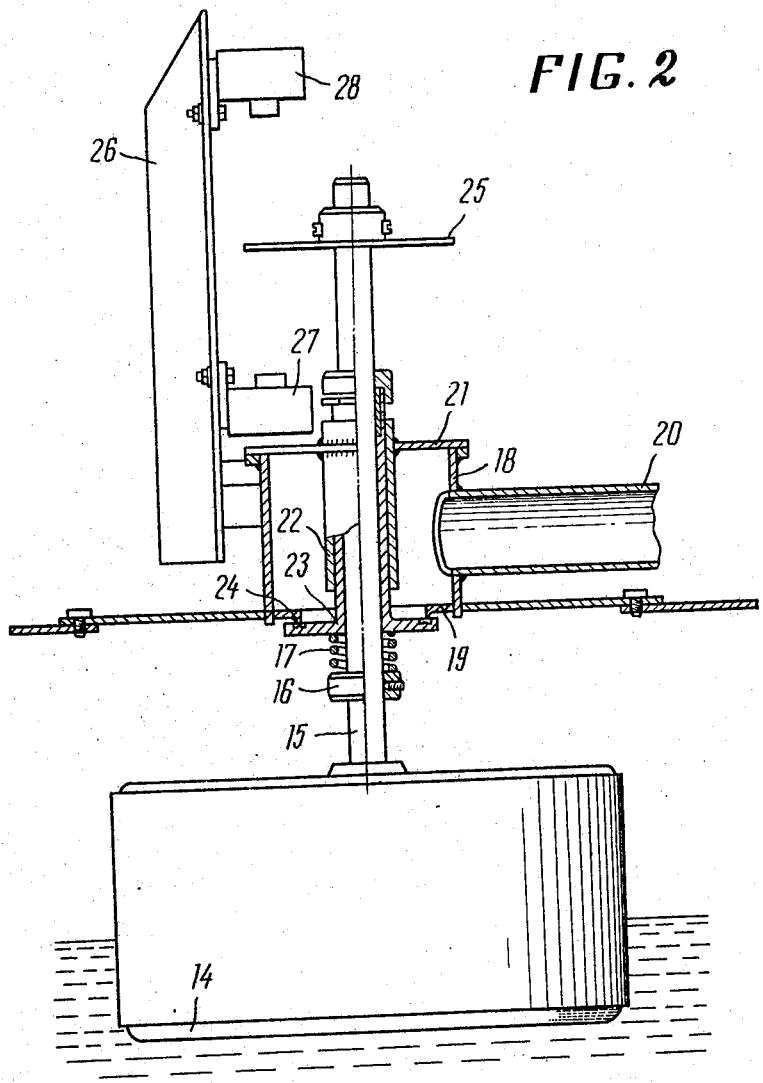

3,486,437
AUTOMATIC MUST FERMENTATION PLANT
Petr Dmitrievich Bazhenov, Voleslav Zakharovich Orekhanov, Vladimir Gavrilovich Rubets, and Vladimir Ivanovich Fialkovsky, Krasnodar, U.S.S.R., assignors to Anapsky Vinzavod, Anapa, U.S.S.R.
Filed Feb. 23, 1968, Ser. No. 707,518
Int. Cl. C12g 3/02
U.S. Cl. 99—276
2 Claims

ABSTRACT OF THE DISCLOSURE

An automatic must fermentation plant including a plurality of tanks, connecting pipes for communication between the tanks and a gas distribution system for the tanks including a level regulator and a $CO_2$ discharge unit associated with said level regulator.

---

The present invention relates to the automatic must fermentation plants.

In the known automatic must fermentation plants the flow of must in the battery of fermentation tanks is made continuous, owing to the pressure of $CO_2$ (carbon dioxide) in said tanks which communicate with one another through connecting pipes, said battery being equipped with a gas distributing system with a float-type level regulator and a carbon dioxide discharge valve.

The disadvantages of this type of plant lie in the complexity of design and also in the accumulation of dead yeast cells in the fermentation tanks.

An object of the present invention is to eliminate the aforesaid disadvantages.

A further and more specific object of the invention is to provide an automatic must fermentation plant of simple design, which eliminates the possibility of accumulation of dead yeast cells in the fermentation tanks.

As distinct from the known plants, the gas-distributing system of the fermentation plant according to the invention is made in the form of a header communicating through the $CO_2$ discharge valve with the first tank of the battery and directly with the other tanks, said header being fitted at its outlet with a pressure regulator for maintaining a constant overpressure within the tanks.

Besides, the $CO_2$ discharge valve can be installed on the rod of the float-type level regulator.

Other objects and advantages of the invention will become apparent from the description which follows, and the accompanying drawings in which:

FIG. 2 illustrates the $CO_2$ discharge valve with a float type level regulator.

Figure 1:
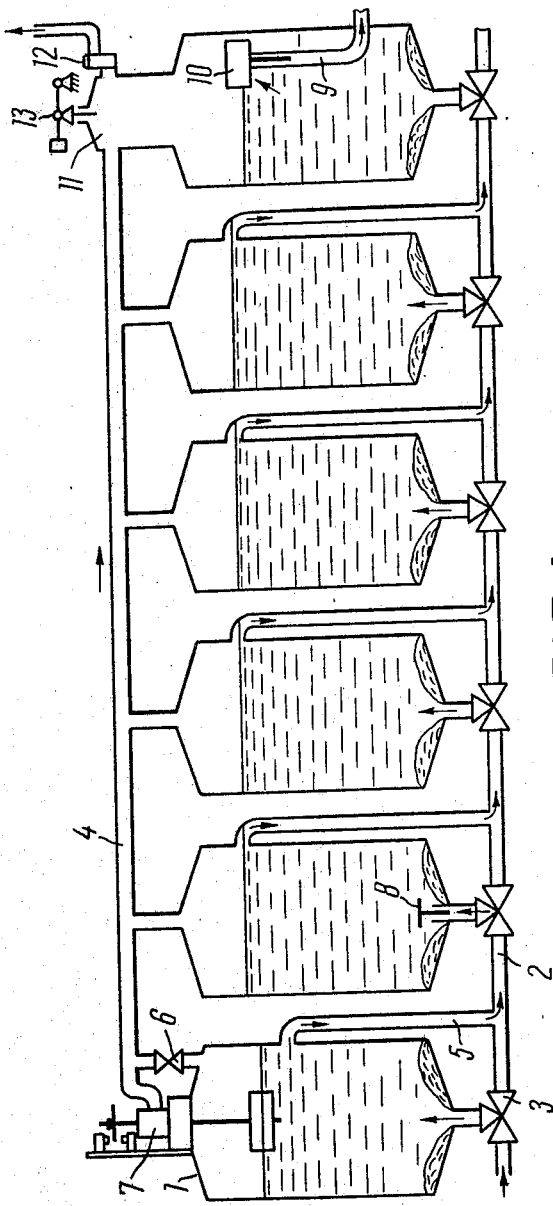
FIG. 1 illustrates the automatic must fermentation plant, according to the invention.

The automatic must fermentation plant consists of 6–8 fermentation tanks 1 (FIG. 1) the capacity of which is selected to suit the required output. The tanks 1 should be provided with heat-exchange jackets.

All the tanks are interconnected at their bottoms by a header 2 via three-way stopcocks 3; said header serves for the admission of the fermenting must from one tank into another and for emptying the tanks at the end of the wine-making season.

On top, the tanks are interconnected by a header 4 for discharging the carbon dioxide.

In addition, each tank communicates with the header 2 through pipes 5 which carry the fermenting must from tank to tank.

The first tank 1 has a valve 6 mounted for discharging the surplus $CO_2$ into the header 4, and a $CO_2$ discharge unit 7 with a float-type level regulator.

In the second tank, there is provided a return valve 8 which prevents the fermenting must from returning to the first tank from the second tank during the working cycle. The upper end of the connecting pipe 5 on the first tank is installed 200 mm. lower than it is on the other tanks.

The last tank has a drain pipe 9 closed by a float valve 10. The float valve 10 allows the discharge of the fermented wine stock from the tank but keeps the carbon dioxide in. The upper part of the last fermentation tank is fitted with a foam collector 11 for accumulating the foam coming in from the preceding tanks together with the $CO_2$ gas.

Installed at the end of gas header 4 is a pressure regulator 12 which maintains a constant overpressure at which the fermentation process proceeds.

A safety valve 13 mounted on the foam collector protects the plant against damage in the event of failure of the pressure regulator 12.

The $CO_2$ discharge unit 7 with the float-type level regulator consists of a float 14 (FIG. 2), rod 15, lower stop 16, spring 17, body 18 with the seat for the valve 19 and pipe 20, a cover 21 with bushing 22, a valve 23 with gasket 24, an upper disc-type stop 25, and an upright 26 with "START" and "STOP" buttons 27 and 28.

The extension of the valve 23 has the shape of bushing 22 and is free to move in the bushing 22 of the cover 21, accommodating the freely moving rod 15 of the float 14.

The operating principle of the plant is based on the automatic supply of fresh must to suit the rate of fermentation (depending on the amount of $CO_2$ liberated during fermentation) and on the subsequent gravity flow of the fermenting wine stock into the other tanks.

The movement of must in the plant under the steady operating conditions and a preset pressure proceeds in two cycles.

First cycle.—The fermenting must flow from the first tank into the other tanks because the $CO_2$ pressure in the first tank is higher than that in the other tanks.

Second cycle.—The first fermentation tank is filled with a new portion of fresh must.

The operation of the plant is divided into three stages, viz., starting, automatic operation at a preset fermentation pressure, and emptying the tanks after work.

The plant is started as follows. The first fermentation tank is filled with must and 10% by volume of yeast. Then an interval of time is allowed for fermentation to start, after which the must is supplied at the preset plant capacity until the second tank becomes filled. As soon as said second tank is full, the $CO_2$ discharge unit 7 with the float regulator is started, the pressure is controlled by the regulator 12 and subsequent filling proceeds automatically. As soon as the last tank is filled, the plant begins steady automatic operation under pressure.

The $CO_2$ liberated during fermentation from all the tanks except the first one is discharged into the atmosphere through header 4, foam collector 11 and pressure regulator 12.

The $CO_2$ pressure in the first tank (the valve 23 being closed) rises higher than that in the other tanks and this overpressure forces the must through the pipe 5 and valve 8 into the second tank. Subsequently, the must moves owing to the difference of levels.

The liquid level in the first tank drops and so does the float 14 (FIG. 2) until the upper disc-type stop 25 comes in contact with the upper end of the bushing of the valve 23. The liquid level will continue dropping, but the float will be jammed in position because the valve is acted upon by the $CO_2$ pressure from underneath.

The valve will open when the total weight of the float 14, rod 15 with the stops 16, 25 and spring 17 overcomes the pressure of $CO_2$ on the valve. At this moment the valve will open, the float will go down and the stop 25 will press the "START" button 27.

This completes the first working cycle.

The "START" button 27 turns on the pump feeding the fresh must into the plant.

The $CO_2$ gas passes through the hole in the seat of the valve 19 and pipe 20 into the header 4 whence it is discharged into the atmosphere.

Foam settles in the foam collector 11.

With the pump running, the must level in the first tank rises and lifts the float 14 which lifts and closes the valve 23 through the rod 15, stop 16 and spring 17.

Having closed the valve 23 the float 14 continues to rise, compressing the spring 17 until the stop 25 presses the "STOP" button 28 thereby stopping the pump.

This delay in stopping the pump is required to allow the float 14 to support the valve 23 for some time until it is closed by the pressure in the tank.

After the pump is stopped, the first working cycle is repeated over again.

The fermented wine stock entering the last tank raises the float 10 and is discharged from the plant.

The carbon dioxide is separated from foam in the foam collector 11 and is discharged into the atmosphere though it is more expedient to discharge it into an alcohol trap for separating the alcohol and aromatic substances.

The pressure regulator 12 ensures the requisite optimum pressure during fermentation.

At the end of the wine-making season the fermentation tanks are emptied of the wine stock, as the fermentation process is completed beginning with the last tank through the header 2 and can subsequently be used as storage tanks.

In the course of plant operation the dead yeast cells accumulated on the tank bottom improve the quality of the wine stock due to autolysis.

The amount of the yeast cells is not large since the spray of fermenting must emerging from the tank bottom carries the surplus residue to the other tanks.

What is claimed is:

1. An automatic must fermentation plant comprising a plurality of fermentation tanks for a continuous flow of must, said flow being induced by the pressure of carbon dioxide; connecting pipes for communication between said tanks; a gas-distributing system for said tanks with a float-type level regulator and a $CO_2$ discharge unit, said gas-distributing system including a header communicating via said $CO_2$ discharge unit with the first tank and directly with the other tanks of said plurality and said header being provided at the outlet end thereof with a pressure regulator for maintaining a constant overpressure inside the tanks.

2. An automatic must fermentation plant according to claim 1 wherein the float-type level regulator includes a rod and the $CO_2$ discharge unit includes a valve mounted on said rod for being opened and closed in accordance with movement of the rod.

References Cited

UNITED STATES PATENTS

| | | | |
|---|---|---|---|
| 963,458 | 7/1910 | Moeller | 99—276 |
| 2,139,408 | 12/1938 | Heuser | 99—35 X |
| 3,071,469 | 1/1963 | Krabbe | 99—277.1 |
| 3,207,606 | 9/1965 | Williams | 99—276 |

ROBERT W. JENKINS, Primary Examiner